(12) United States Patent
Wu et al.

(10) Patent No.: US 12,435,828 B2
(45) Date of Patent: Oct. 7, 2025

(54) HORIZONTAL-VERTICAL SWITCHING STRUCTURE, CONNECTING MECHANISM, AND SHOOTING DEVICE

(71) Applicant: TILTA INC., Burbank, CA (US)

(72) Inventors: Sen Wu, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/232,186

(22) Filed: Aug. 9, 2023

(65) Prior Publication Data

US 2024/0401736 A1    Dec. 5, 2024

(30) Foreign Application Priority Data

May 31, 2023   (CN) .......................... 202310639192.X

(51) Int. Cl.
  *F16M 11/10*   (2006.01)
  *G03B 17/56*   (2021.01)
  *F16M 13/02*   (2006.01)

(52) U.S. Cl.
  CPC ........... *F16M 11/10* (2013.01); *G03B 17/561* (2013.01); *F16M 13/02* (2013.01); *F16M 2200/021* (2013.01)

(58) Field of Classification Search
  CPC ...... F16M 11/02; F16M 11/04; F16M 11/041; F16M 11/06; F16M 11/08; F16M 11/10;
(Continued)

(56) References Cited

U.S. PATENT DOCUMENTS 4,648,698 A * 3/1987 Iwasaki ................. F16M 13/00
  396/419
4,727,390 A * 2/1988 Brown ............... F16M 11/2092
  396/428
(Continued)

FOREIGN PATENT DOCUMENTS

CN         207246709 U      4/2018

*Primary Examiner* — Christopher Garft
*Assistant Examiner* — Michael McDuffie
(74) *Attorney, Agent, or Firm* — LOZA & LOZA, LLP; Derek Yeung

(57) ABSTRACT

The present disclosure relates to the field of photographic equipment technology, particularly to a horizontal-vertical switching structure, connecting mechanism, and shooting device that enable convenient angle adjustments for shooting. One embodiment of the horizontal-vertical switching structure comprises a supporting component, a connecting component, and a locking component. The supporting component is equipped with an installation position for mounting the shooting device on one end and an inclined first surface on the other end. The connecting component complements the first surface with a second inclined surface. The locking component includes a first rotating part connected to the first inclined surface and a second rotating part connected to the second inclined surface. The relative rotation of the first and second rotating parts allows for rotation or locking of the supporting component and the connecting component. In practical use, the shooting device can be switched between horizontal and vertical shooting angles by mounting it on the installation position and rotating the supporting component and the connecting component along the contact surfaces of the first and second inclined surfaces. This eliminates the need for disassembly and reinstallation, providing convenient angle adjustments.

17 Claims, 15 Drawing Sheets

(58) Field of Classification Search
CPC ........ F16M 11/16; F16M 11/18; F16M 13/02; F16M 2200/021
USPC ......... 248/177.1, 178.1, 179.1, 180.1, 183.1, 248/186.1, 186.2; 396/419, 420, 422, 396/425, 428
See application file for complete search history.

(56) References Cited

U.S. PATENT DOCUMENTS

| | | | | |
|---|---|---|---|---|
| 5,497,214 A * | 3/1996 | Labree | ................... | F16M 11/08 |
| | | | | 396/428 |
| 5,528,325 A * | 6/1996 | Perez | ..................... | G03B 15/03 |
| | | | | 396/428 |
| 6,254,044 B1 * | 7/2001 | Lee | ........................ | F16M 11/16 |
| | | | | 248/181.2 |
| 7,241,060 B2 * | 7/2007 | Mootz | .................. | F16M 11/105 |
| | | | | 396/428 |
| 7,549,807 B2 * | 6/2009 | Nazarian | .............. | G03B 17/563 |
| | | | | 396/420 |
| 7,854,556 B2 * | 12/2010 | Wood | .................... | G03B 17/00 |
| | | | | 396/419 |
| 8,192,096 B1 * | 6/2012 | Harwick | .............. | G03B 17/561 |
| | | | | 396/428 |
| 8,475,060 B2 * | 7/2013 | Chapman | ............... | B66F 11/048 |
| | | | | 248/185.1 |
| 8,561,952 B2 * | 10/2013 | Pfeiler | ................. | F16M 11/045 |
| | | | | 396/428 |
| 8,657,509 B2 * | 2/2014 | Galik | ................... | F16M 13/022 |
| | | | | 396/428 |
| 8,827,219 B2 * | 9/2014 | Kessler | ................ | F16M 11/041 |
| | | | | 396/428 |
| 8,915,476 B2 * | 12/2014 | Nakatani | ............... | G03B 17/561 |
| | | | | 248/163.1 |
| 10,088,096 B2 * | 10/2018 | Minn | ..................... | F16M 11/14 |
| 11,442,343 B2 * | 9/2022 | Zhao | ..................... | F16M 11/123 |
| 2011/0116782 A1 * | 5/2011 | Scott | ..................... | G03B 17/00 |
| | | | | 396/428 |
| 2014/0103181 A1 * | 4/2014 | Duerigen | ............. | F16M 11/041 |
| | | | | 248/289.11 |
| 2014/0124631 A1 * | 5/2014 | Olander | ................. | F16M 11/10 |
| | | | | 248/176.1 |
| 2014/0209777 A1 * | 7/2014 | Klemin | .................. | F16M 13/04 |
| | | | | 29/525.08 |
| 2015/0285429 A1 * | 10/2015 | Le | ........................ | G03B 17/561 |
| | | | | 248/178.1 |
| 2016/0085139 A1 * | 3/2016 | Ben Yehuda | ........ | G03B 17/563 |
| | | | | 396/420 |
| 2017/0315428 A1 * | 11/2017 | Johnson, Sr. | ...... | F16M 11/2078 |

\* cited by examiner

# HORIZONTAL-VERTICAL SWITCHING STRUCTURE, CONNECTING MECHANISM, AND SHOOTING DEVICE

CROSS-REFERENCE TO RELATED APPLICATIONS

The present application for Patent claims priority to and the benefit of pending Chinese Patent Application No. 202310639192X, filed May 31, 2023, and hereby expressly incorporated by reference herein as if fully set forth below in its entirety and for all applicable purposes.

TECHNICAL FIELD

The present disclosure relates to the technical field of photographic equipment, in particular to a horizontal-vertical switching structure, a connecting mechanism, and a shooting device.

INTRODUCTION

In the field of photography, the use of camera gimbals has become commonplace among staff members to ensure stable shooting processes. Typically, a connecting bracket is employed to attach the camera to the gimbal, allowing for the buffering of slight vibrations. However, a common challenge arises when staff members need to switch between vertical and horizontal shooting orientations. This requires adjusting the camera's direction, often necessitating the disassembly and reinstallation of the connecting bracket to achieve the desired orientation. Such a method proves to be complex and hampers the efficiency of shooting work.

A prior art structure for fixing the camera angle position of a panoramic head, (Chinese patent application number 201721199300.2) in the field of techniques for photography, has been disclosed. It involves a moving component, a camera angle position mechanism, a camera connecting structure, and a clamping fixing mechanism. The clamping fixing mechanism comprises a circular ring, a rotating shaft, a rotating pin, a bracket, and a connecting element. The circular ring consists of a fixed semicircular ring and a rotating semicircular ring. The fixed semicircular ring is affixed to the bracket, while one end of the rotating semicircular ring is fixed to the rotating pin of the fixed semicircular ring. The rotating semicircular ring has the ability to rotate around the rotating pin, while the rotating shaft is secured to the moving component and cooperates with the inner circle of the circular ring. In this technical solution, adjusting the camera's direction requires disassembling the connecting bracket from the gimbal, making adjustments, and reinstalling the bracket, thus allowing for angle adjustments during shooting.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

In order to achieve the above object, the technical schemes of the present disclosure are as follows.

A first objective of the present disclosure is to provide a structure that facilitates convenient adjustment of the shooting angle between horizontal and vertical orientations.

Another objective of the present disclosure is to offer a connecting mechanism that enables convenient adjustment of the shooting angle.

Yet another objective of the present disclosure is to offer a shooting device that enables convenient adjustment of the shooting angle.

To accomplish the above objectives, the present disclosure introduces a structure for seamlessly switching between horizontal and vertical orientations. The structure includes: a supporting component, a connecting component, and a locking component.

Supporting Component: One end features an installation position for mounting the shooting device, while the other end includes a tilted first inclined surface.

Connecting Component: It incorporates a second inclined surface that complements the first inclined surface.

Locking Component: It comprises a first rotating portion and a second rotating portion capable of relative rotation. The first rotating portion is connected to the first inclined surface, while the second rotating portion is connected to the second inclined surface. This arrangement allows for the rotation or locking of the supporting component and connecting component.

In practical application, the shooting device can be mounted on the installation position, enabling the supporting component and connecting component to rotate along the contact surface of the first inclined surface and the second inclined surface. This facilitates convenient adjustment of the shooting angle in both horizontal and vertical directions, eliminating the need for dismantling and reinstalling the shooting device. The angle adjustment process is highly convenient.

Preferably, the connecting component is equipped with a gimbal connection position, enabling connection to a gimbal. The second inclined surface is positioned at one end of the connecting component, while the gimbal connection position is located at the other end.

Moreover, the first rotating portion comprises a pivot axis (a pivot shaft, a connecting shaft), and the second rotating portion includes a first positioning column. The first positioning column protrudes from the second inclined surface and features a first through-hole. The first inclined surface has a second through-hole corresponding to the first through-hole. The first positioning column passes through the second through-hole, establishing communication between the first and second through-holes. The pivot axis (pivot shaft) sequentially passes through the first and second through-holes, allowing the supporting component and connecting component to slide along the first inclined surface and the second inclined surface.

Furthermore, the locking component includes a first locking screw. The sidewall of the supporting component has a third through-hole, through which the first locking screw passes to tightly abut against the first positioning column, preventing relative rotation between the supporting component and the connecting component. When rotation is desired, the first locking screw is loosened, and when fixation is required, the first locking screw is tightened.

Additionally, the second inclined surface or the first inclined surface is equipped with an annular limit groove surrounding the first positioning column. The first inclined surface or the second inclined surface contains a limit column (e.g., a limit pin) that slides within the annular limit groove, restricting the rotation angle between the supporting component and the connecting component.

During usage, for horizontal shooting, the supporting component is positioned horizontally, and the shooting device is placed on it. For vertical shooting, the first locking screw of the locking component is loosened, allowing the first inclined surface of the supporting component to slide relative to the second inclined surface, thereby changing the angle of the supporting component to a vertical position. Consequently, the shooting device on the supporting component aligns with the vertical direction, enabling vertical shooting. The switching between horizontal and vertical shooting in this application does not require disassembly and reinstallation of the shooting device, making it faster and more convenient.

To achieve the aforementioned objectives, the present invention further provides a connecting mechanism that incorporates the aforementioned structure for switching between horizontal and vertical orientations. The connecting mechanism consists of the structure for switching between horizontal and vertical orientations and an adapter. The adapter comprises a fixing portion (a fixing part) and a rotating portion (a rotating part) that are movably connected. The fixing portion, positioned on one side of the adapter away from the rotating portion, includes a first locking component for securing the adapter in the installation position. The rotating portion, located on the side of the adapter away from the fixing portion, features a second locking component for securing the shooting device. Preferably, the fixing portion and the rotating portion are connected in a rotatable manner.

With this arrangement, when transitioning to vertical shooting mode, the supporting component undergoes a 90° rotation relative to the connecting component, positioning the supporting component vertically for vertical shooting. Consequently, the camera lens mounted in the installation position rotates from the front to the back in accordance with the rotation of the supporting component. At this point, the rotating portion also rotates, performing a 180° rotation relative to the fixing portion, thus orienting the lens forward.

Furthermore, the adapter incorporates a transitional pivot axis that enables the rotation of the rotating portion and the fixing portion while maintaining their connection.

Moreover, the fixing portion is equipped with a second positioning column on the side facing the rotating portion. The second positioning column features a fourth through-hole in the middle, while the rotating portion possesses a first mounting hole. The second positioning column is inserted into the first mounting hole, establishing communication between the fourth through-hole and the first mounting hole. The transitional pivot axis is sequentially inserted into the fourth through-hole and the first mounting hole, allowing the rotating portion to rotate relative to the fixing portion.

Additionally, the adapter includes a first locking component. The sidewall of the rotating portion is equipped with a fifth through-hole through which the first locking component is inserted to lock or release the rotation of the rotating portion and the fixing portion, thereby either preventing or supporting their relative rotation.

Moreover, the first locking component is threadedly connected to the fifth through-hole, enabling it to move closer to or away from the second positioning column. When the first locking component is tightened, it applies pressure against the second positioning column, restricting the rotation of the rotating portion relative to the fixing portion. Conversely, when the first locking component is loosened, it disengages from the second positioning column, allowing the rotating portion to rotate relative to the fixing portion and adjust the direction.

Furthermore, the first locking component comprises a reset spring, a button, a first limiting bar, and a fixed block. One end of the first limiting bar is connected to the button, which protrudes from the outer side of the rotating portion's sidewall. The other end of the first limiting bar features a limiting projection, and the first limiting bar is movably connected to the fixed block. The reset spring is positioned on the first limiting bar, with its ends respectively connected to the fixed block and the button. The fixing portion is equipped with multiple first limiting grooves inclined to the second positioning column on the end facing the rotating portion that facilitate the movement of the limiting projection along the fourth through-hole by pressing the button. As the limiting projection comes into contact with the fixing portion, the contact area gradually decreases until there is no contact because of the inclined first limiting grooves. This allows the rotating portion to rotate relative to the fixing portion, providing an alternative means of restricting their rotation. Compared to the threaded connection between the first locking component and the fifth through-hole, which involves moving closer to or away from the second positioning column, the button-centered structure described above enables more convenient and swift switching between rotation and locking of the rotating portion and the fixing portion.

Moreover, the fixing portion is equipped with a limit portion movably connected to the fixing portion. The rotating portion, on the side facing the fixing portion, features multiple second limiting grooves corresponding to the limit portion. With this configuration, when transitioning to vertical shooting mode, the limit portion can be compressed, resulting in a 180° rotation of the rotating portion relative to the fixing portion.

Furthermore, the limit portion includes toggling blocks, first limiting blocks, and first limiting springs. The fixing portion contains interconnected first mounting slots and second mounting slots. The first limiting spring and the first limiting block are positioned in the first mounting slot, with the first limiting spring situated between the first limiting block and the bottom of the first mounting slot. The first limiting block partially protrudes from the fixing portion, and one end of the toggling block is connected to the first limiting block, while the other end protrudes from the fixing portion. With this configuration, toggling the toggling block causes the first limiting block to retract into the first mounting slot, allowing the rotating portion to rotate relative to the fixing portion. Releasing the toggling block causes the first limiting block to be pushed back into position. The first limiting block will protrude from the fixing portion and be held in the second limiting groove to prevent the rotating portion from rotating relative to the fixing portion.

Additionally, the present disclosure comprises a first locking component for a shooting device, which includes a first locking latch, a first locking portion, and a first locking column. The first locking column is equipped with a gear (e.g., toothed disk, toothed mechanism) at one end, engaging with the first locking latch. The other end of the first locking column is threadedly connected to the first locking portion, while also being threadedly connected to the third positioning column. The fixing portion features a third mounting slot, and one end of the fixing portion, opposite to the third mounting slot, is equipped with a first clamping block. The first locking portion is positioned within the third mounting slot to create a first clamping space in conjunction with the first clamping block. In this embodiment, rotation of the first locking latch causes tightening of the threaded end of the first locking column connected to the first locking portion. As a result, the first locking portion moves closer to the bottom of the slot and eventually engages with the first clamping block, securely fixing the fixing portion to the supporting component.

Furthermore, the first locking portion is equipped with a third limiting groove, and the bottom of the third mounting slot protrudes a third positioning column, which fits within the third limiting groove. This configuration prevents shaking of the first locking portion.

Moreover, the supporting component is equipped with slide grooves on both sides, within which the first locking portion and the first clamping block can slide. When locked by the first locking latch, the fixing portion can be securely held at any position within the slide grooves.

The rotating portion features a first elongated hole, and the side of the rotating portion is equipped with a fourth mounting slot, which is connected to the first elongated hole. The connecting mechanism further comprises a second limiting block and a first actuating block. The first actuating block is accommodated within the fourth mounting slot, and a second limiting spring is positioned between the fourth mounting slot and the bottom of the first actuating block. The second limiting block is accommodated within the first elongated hole, protruding out from the rotating portion. The supporting component is equipped with an avoidance groove, and a limit hook is provided on the slot arm of the avoidance groove, located away from the connecting component end. The avoidance groove ensures that the second limiting block avoids interference, while the limit hook prevents the fixing portion from sliding off the supporting component. Specifically, an unlocking passage exists between the limit hook and the other side wall of the avoidance groove. When the first actuating block is pressed, it prompts the second limiting block to slide relative to the first elongated hole. If the fixing portion is detached from the supporting component at this point, the second limiting block can slide off through the unlocking passage. However, if the first actuating block is not pressed, the limit hook restricts the movement of the second limiting block, preventing the fixing portion from sliding off the supporting component. In another embodiment, a third limiting block is elastically placed within the first clamping space, and the end of the avoidance groove is equipped with a limiting hole. As the fixing portion slides within the avoidance groove, the third limiting block compresses. Once the fixing portion reaches the end, the third limiting block elastically protrudes into the limiting hole, ensuring anti-detachment functionality.

Moreover, the connecting mechanism also includes a second locking latch, a second locking portion, and a second locking column. The second locking column is equipped with a gear at one end, engaging with the second locking latch. The other end of the second locking column is threadedly connected to the second locking portion. The rotating portion features a fifth mounting slot, and one end of the rotating portion, opposite to the fifth mounting slot, is equipped with a second clamping block. The second locking portion is positioned within the fifth mounting slot, forming a second clamping space with the second clamping block. During operation, when the second locking latch is engaged, it tightens the threaded end of the second locking column connected to the second locking portion. As a result, the second locking portion moves closer to the second locking plate. Consequently, the second locking portion approaches the bottom of the fifth mounting slot and ultimately cooperates with the second clamping block, effectively securing external photographic equipment, such as a quick-release plate or a camera cage.

The present disclosure provides a shooting device characterized by utilizing the aforementioned connecting mechanism with a horizontal and vertical switching structure to achieve the abovementioned goals.

Compared to prior art, the present disclosure offers several advantages. By installing the shooting device on the mounting position and rotating the supporting component and the connecting component along the contact surfaces of the first and second inclined planes, the shooting device can effortlessly switch its shooting angles between horizontal and vertical directions without requiring disassembly or reinstallation. The angle adjustment process is highly convenient.

BRIEF DESCRIPTION OF THE DRAWINGS

In order to more clearly illustrate aspects of the present disclosure or the technical schemes in the prior art, the drawings used in the description of exemplary embodiments will be briefly introduced below. Obviously, the drawings in the following description are only examples of the present disclosure. For those ordinarily skilled in the art, other implementations can be obtained according to the structures shown in these drawings.

DETAILED DESCRIPTION

In order to make the object, technical schemes, and advantages of the present disclosure clearer, the present disclosure will be further described in detail with reference to the accompanying drawings and exemplary embodiments. It should be understood that the specific embodiments described here are intended for illustrating the present disclosure, but not for limiting the present disclosure.

To achieve the above goals, the technical scheme of this present disclosure is as follows:

Embodiment 1

Figure 1:
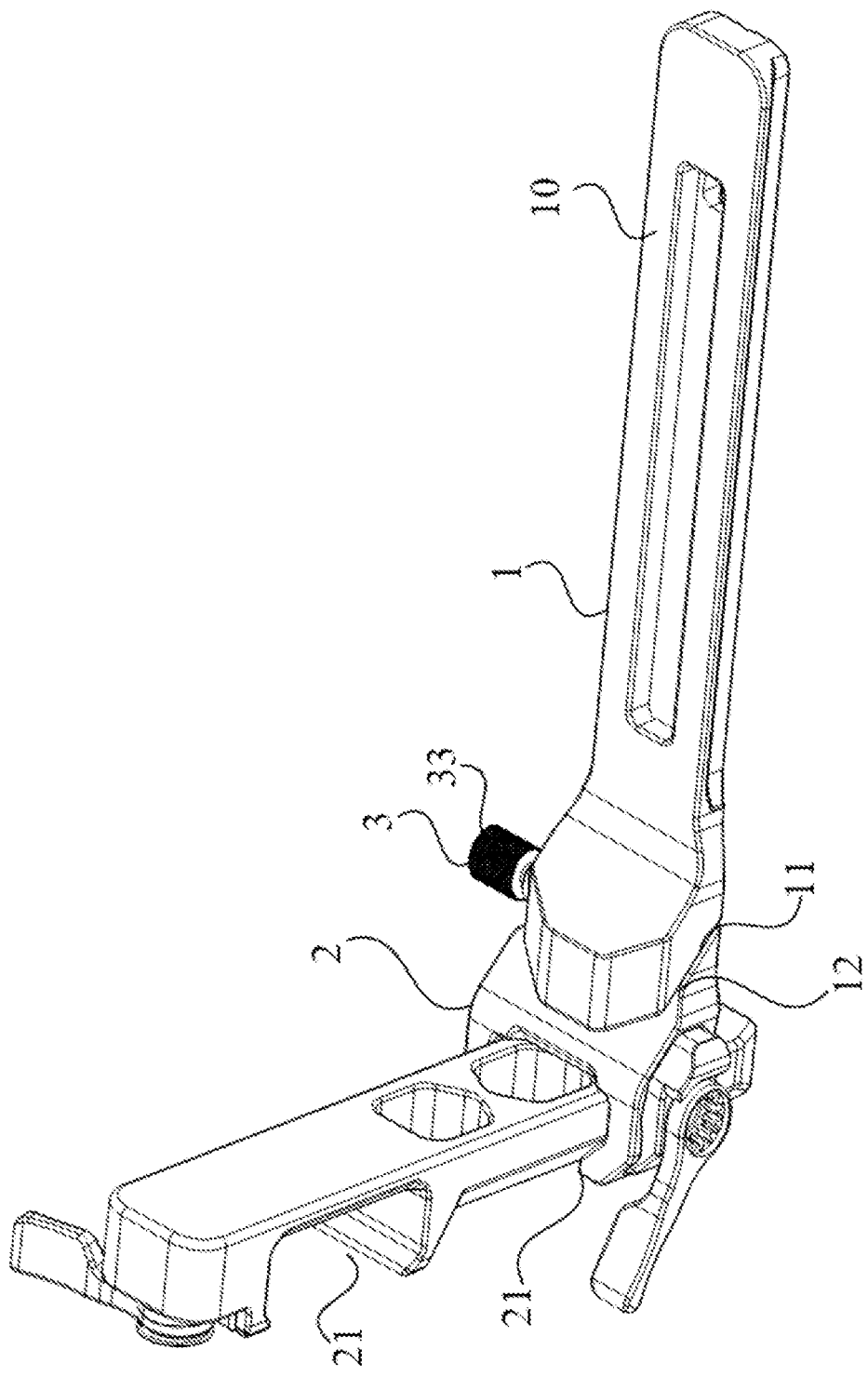
FIG. 1 is a schematic diagram of a horizontal-vertical switching structure according to some aspects of the disclosure.
Figure 2:
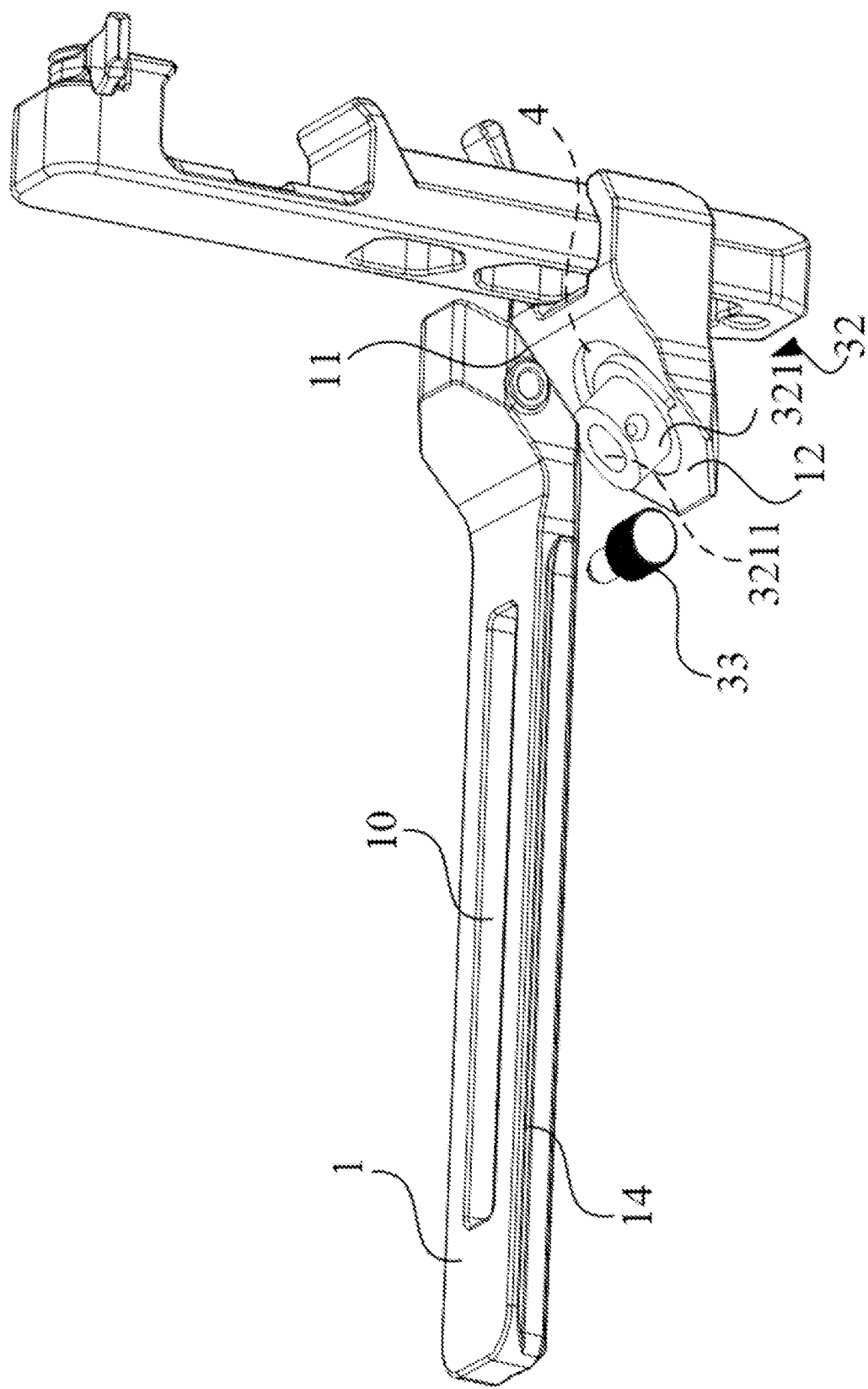
FIG. 2 is a first-perspective exploded view of the horizontal-vertical switching structure of FIG. 1.
Figure 3:
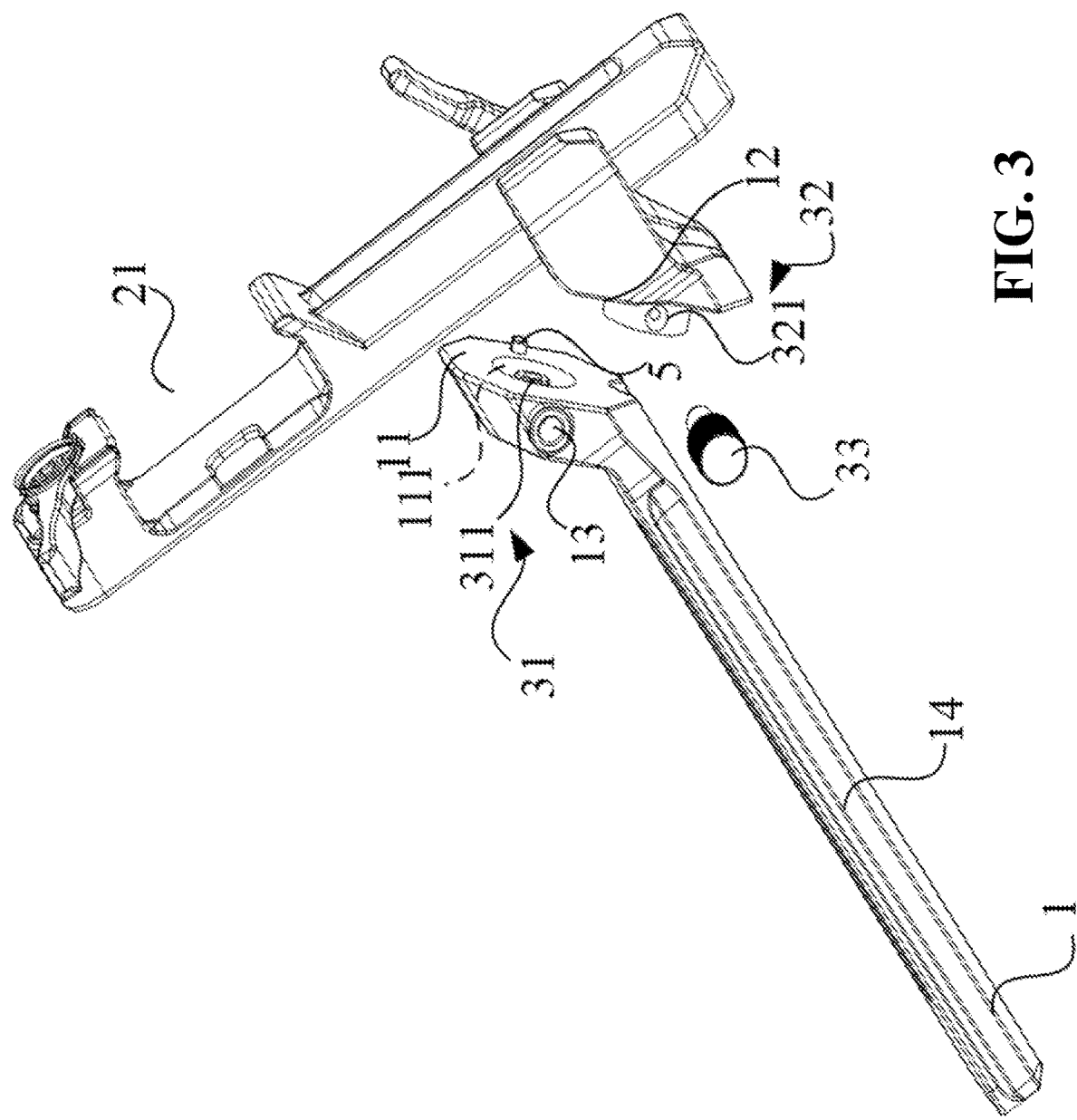
FIG. 3 is a second-perspective exploded view of the horizontal-vertical switching structure of FIG. 1.
Figure 4:
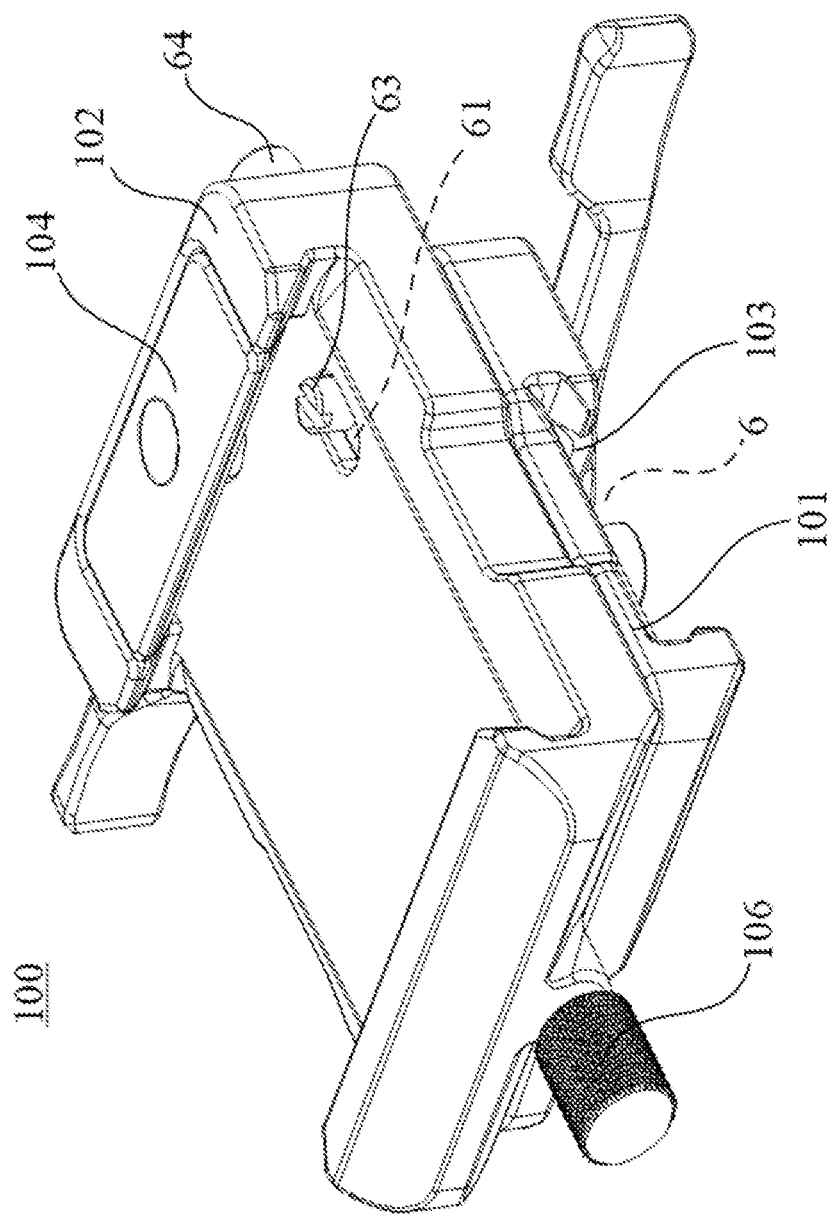
FIG. 4 is a first-perspective schematic diagram of an adapter according to some aspects of the disclosure.
Figure 5:
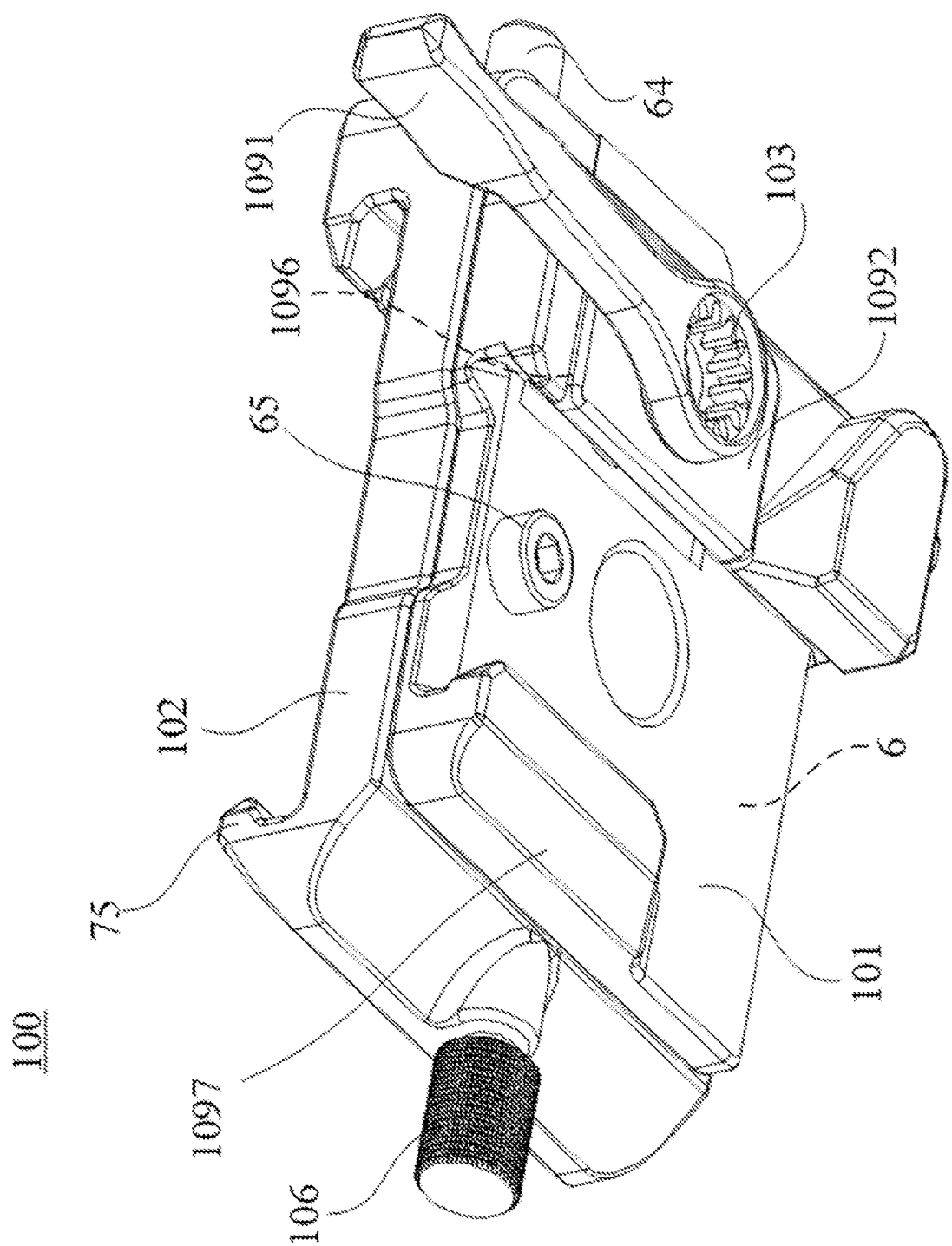
FIG. 5 is a second-perspective schematic diagram of the adapter of FIG. 4 according to some aspects of the disclosure.
Figure 6:
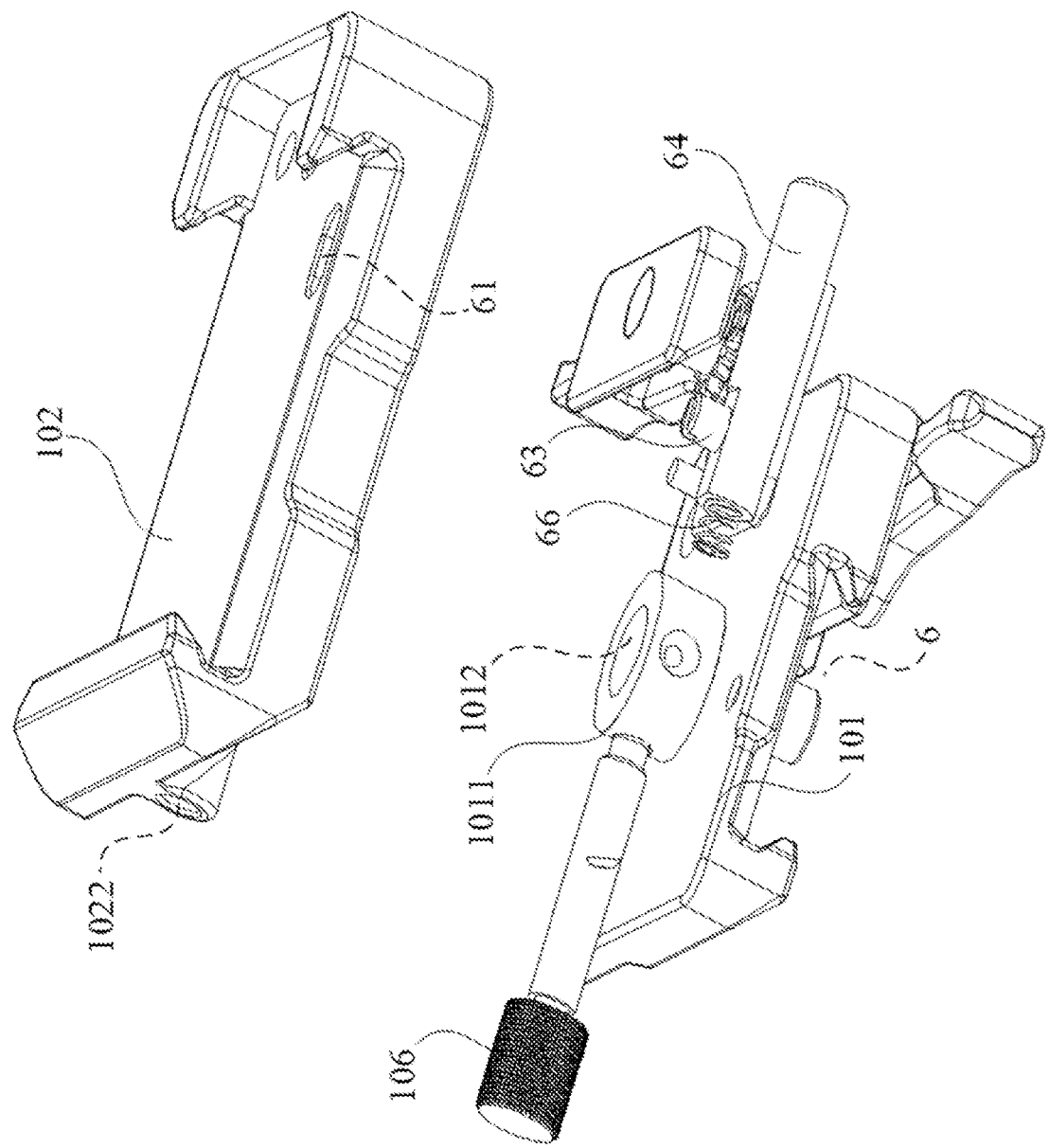
FIG. 6 is a first-perspective exploded view of the adapter of FIG. 4 according to some aspects of the disclosure.
Figure 7:
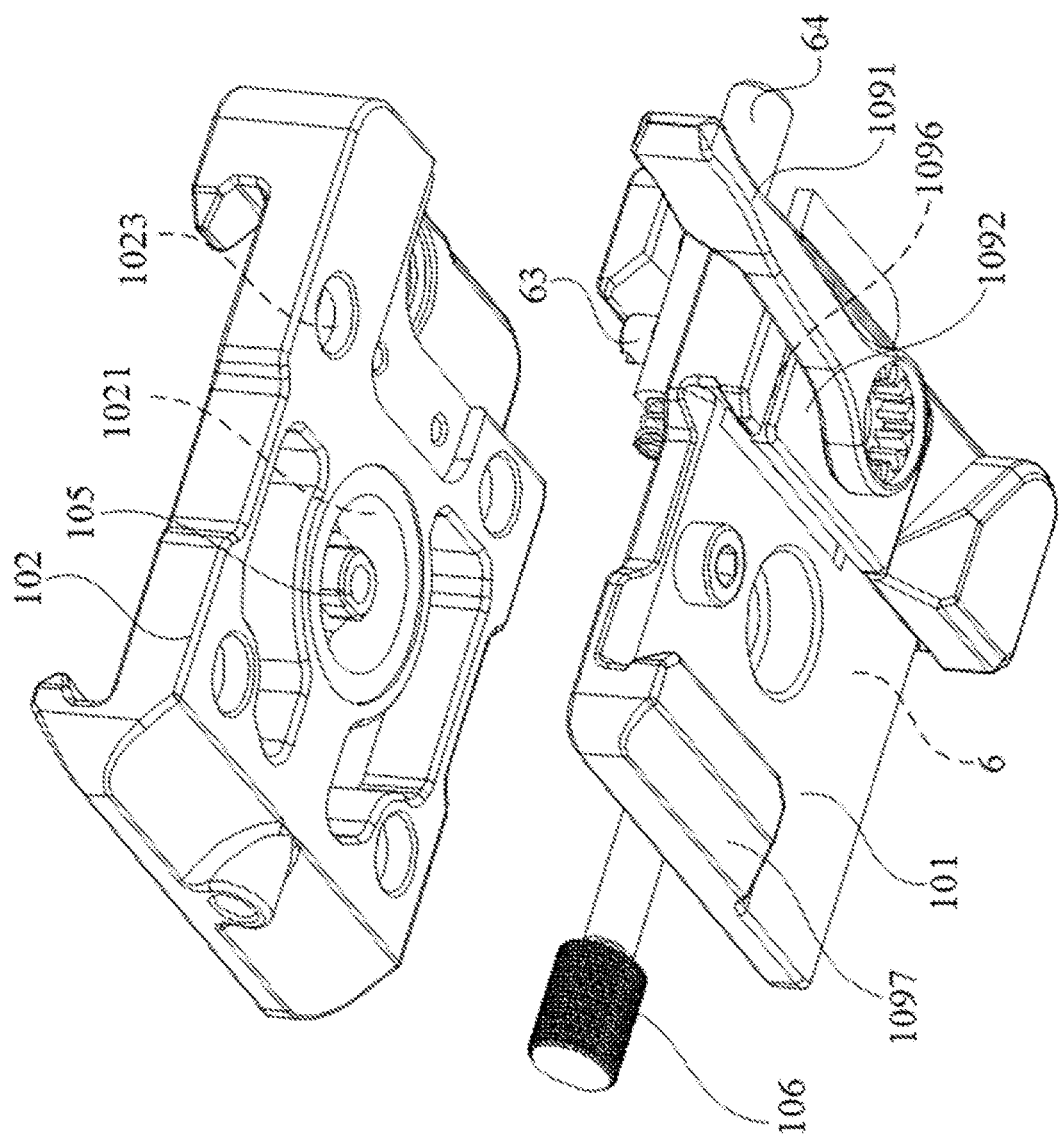
FIG. 7 is a second-perspective exploded view of the adapter of FIG. 4 according to some aspects of the disclosure.
Figure 8:
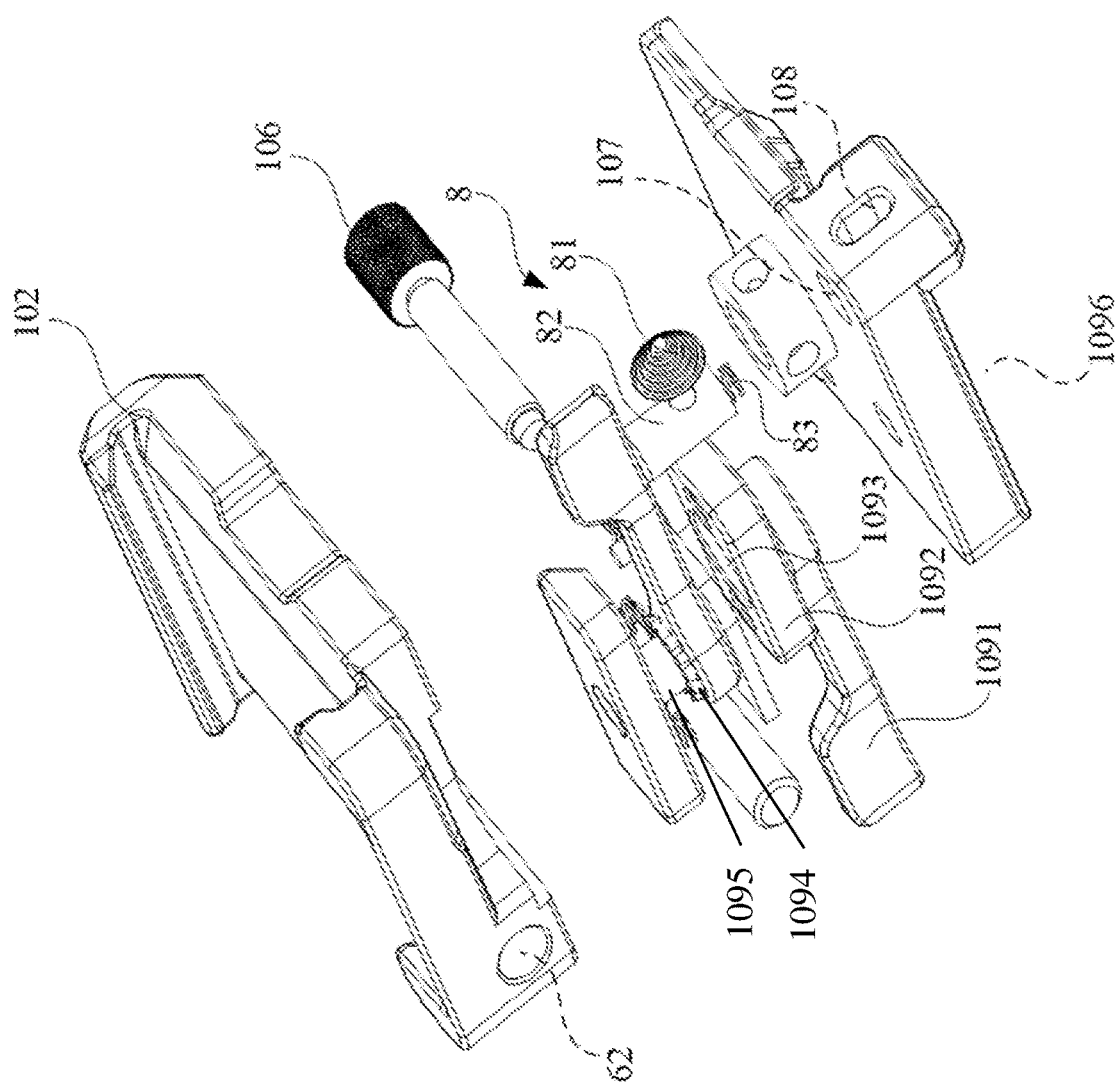
FIG. 8 is a third-perspective exploded view of the adapter of FIG. 4 according to some aspects of the disclosure.
Figure 9:
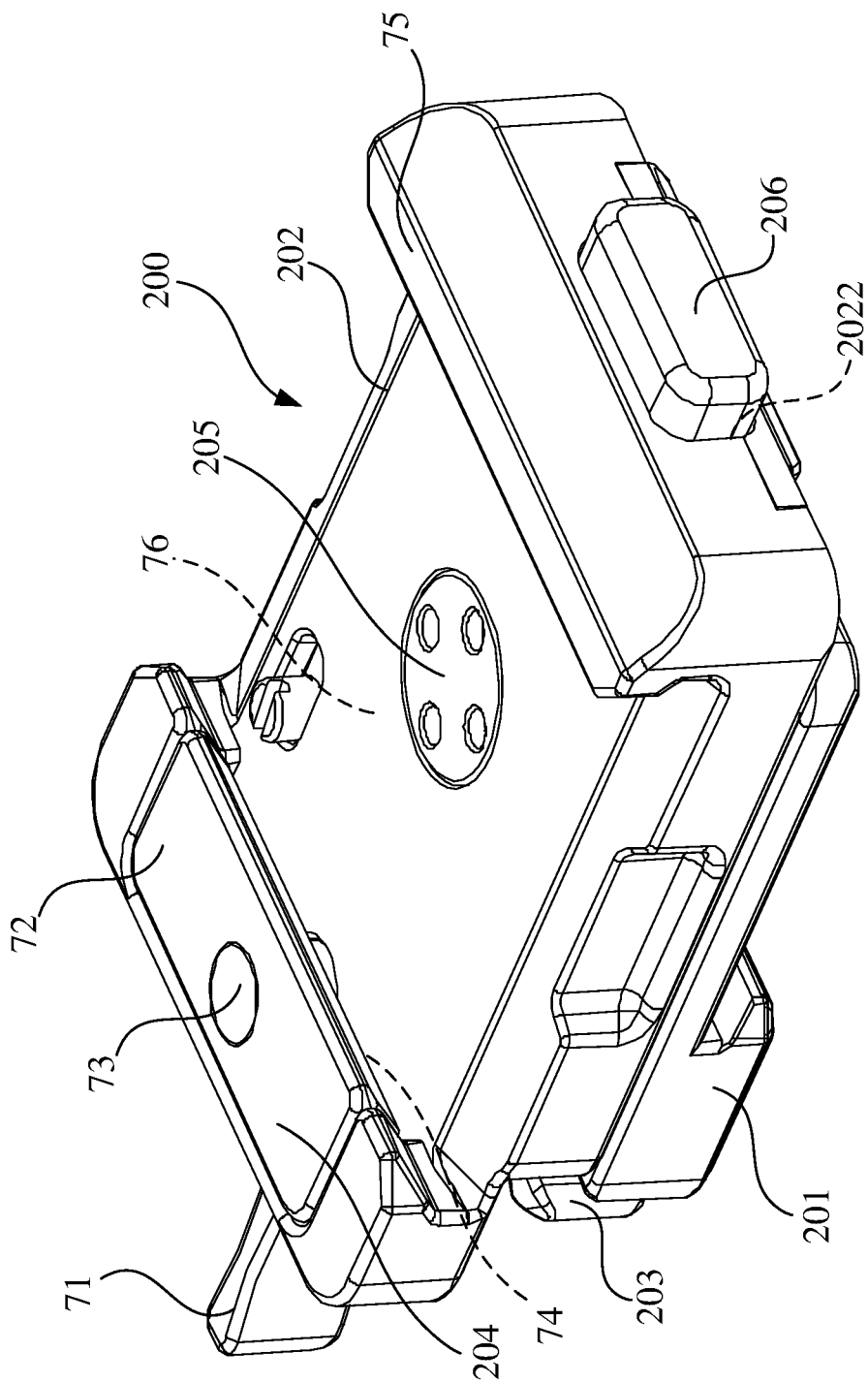
FIG. 9 is a first-perspective structural schematic diagram of an adapter according to some aspects of the disclosure.
Figure 10:
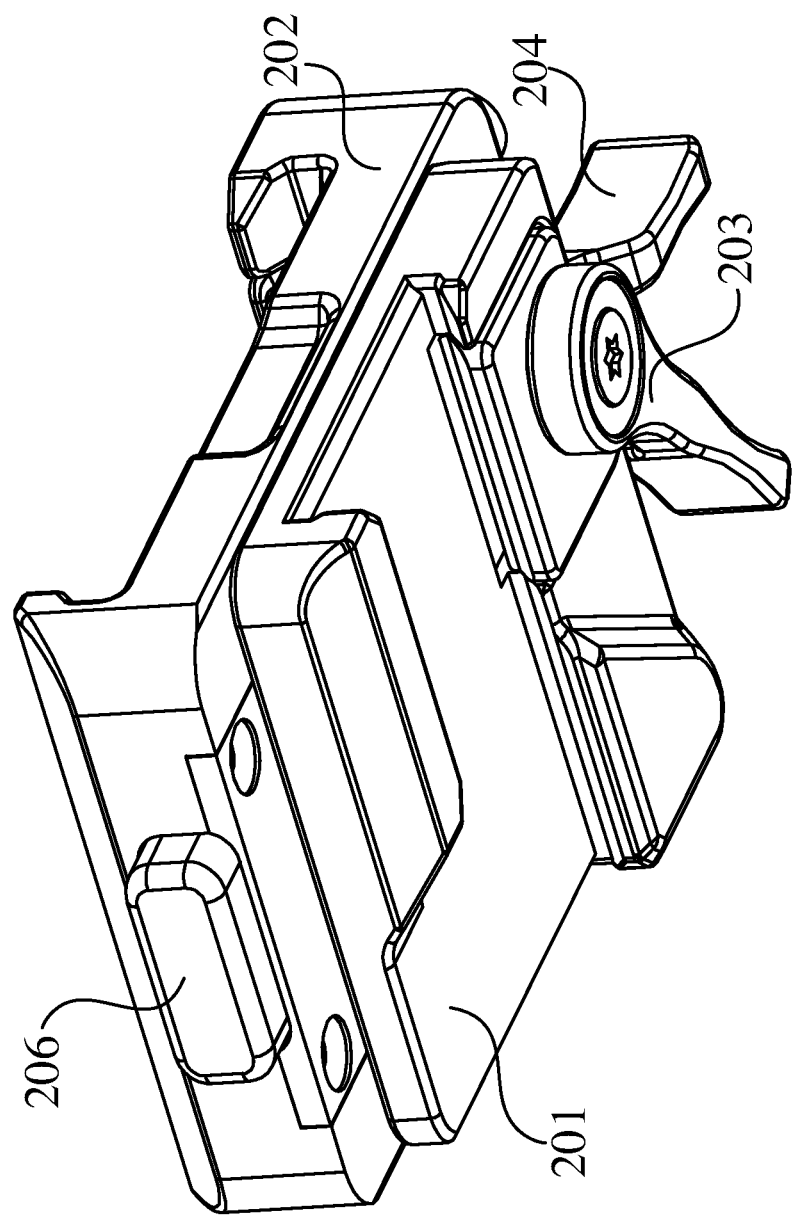
FIG. 10 is a second-perspective structural schematic diagram of the adapter of FIG. 9 according to some aspects of the disclosure.
Figure 11:
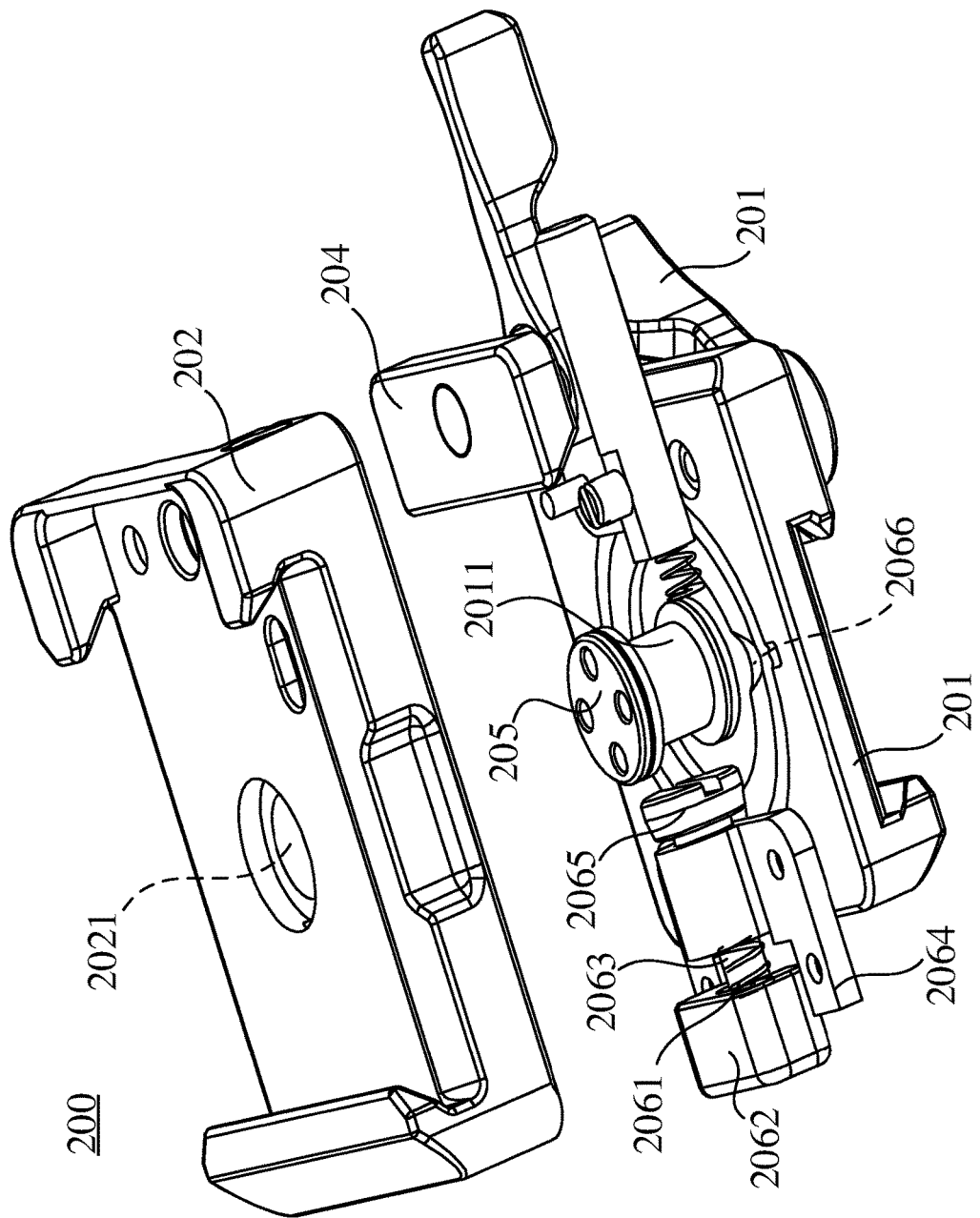
FIG. 11 is a first-perspective exploded view of the adapter of FIG. 9 according to some aspects of the disclosure.
Figure 12:
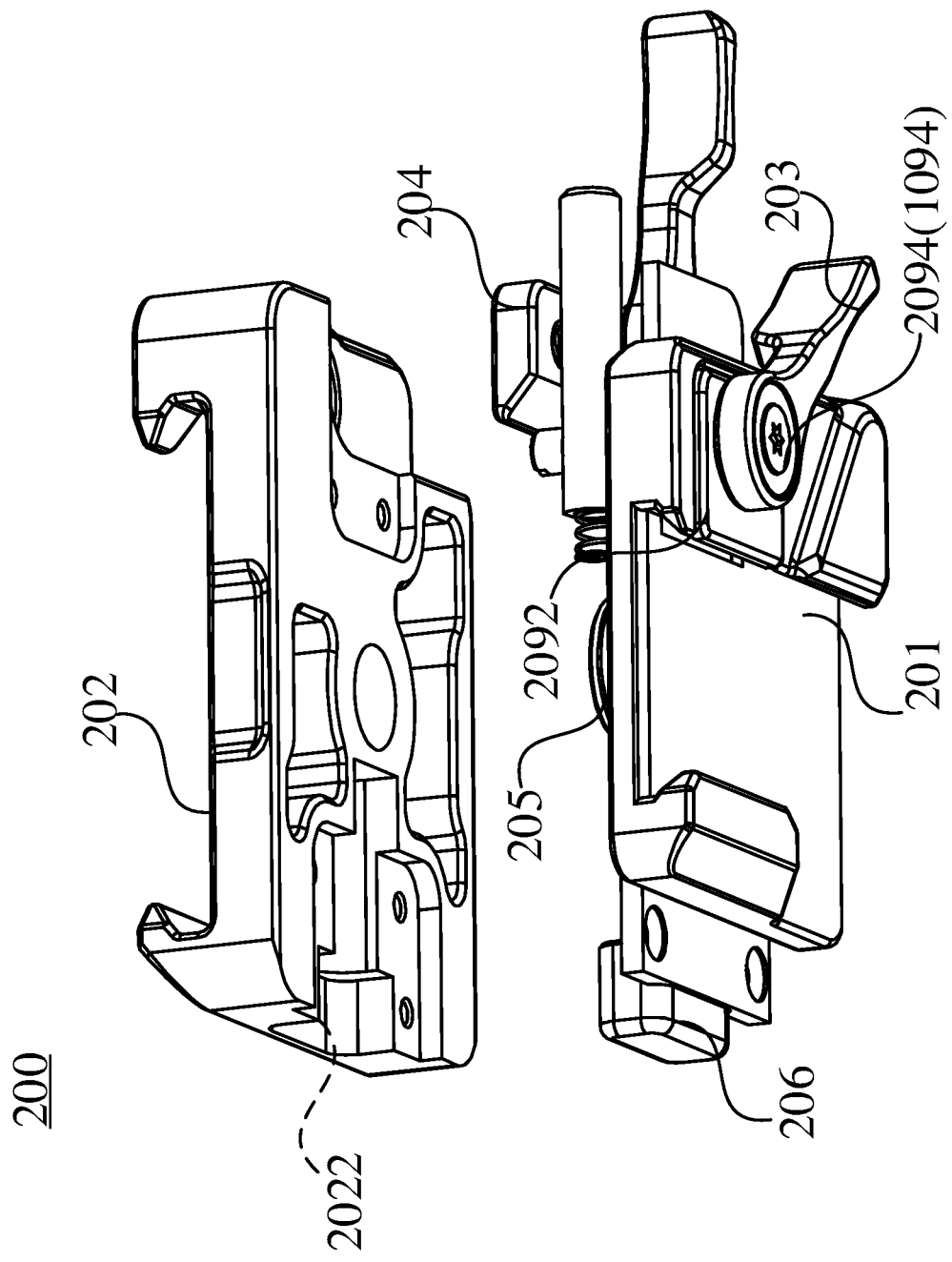
FIG. 12 is a second-perspective exploded view of the adapter of FIG. 9 according to some aspects of the disclosure.
Figure 13:
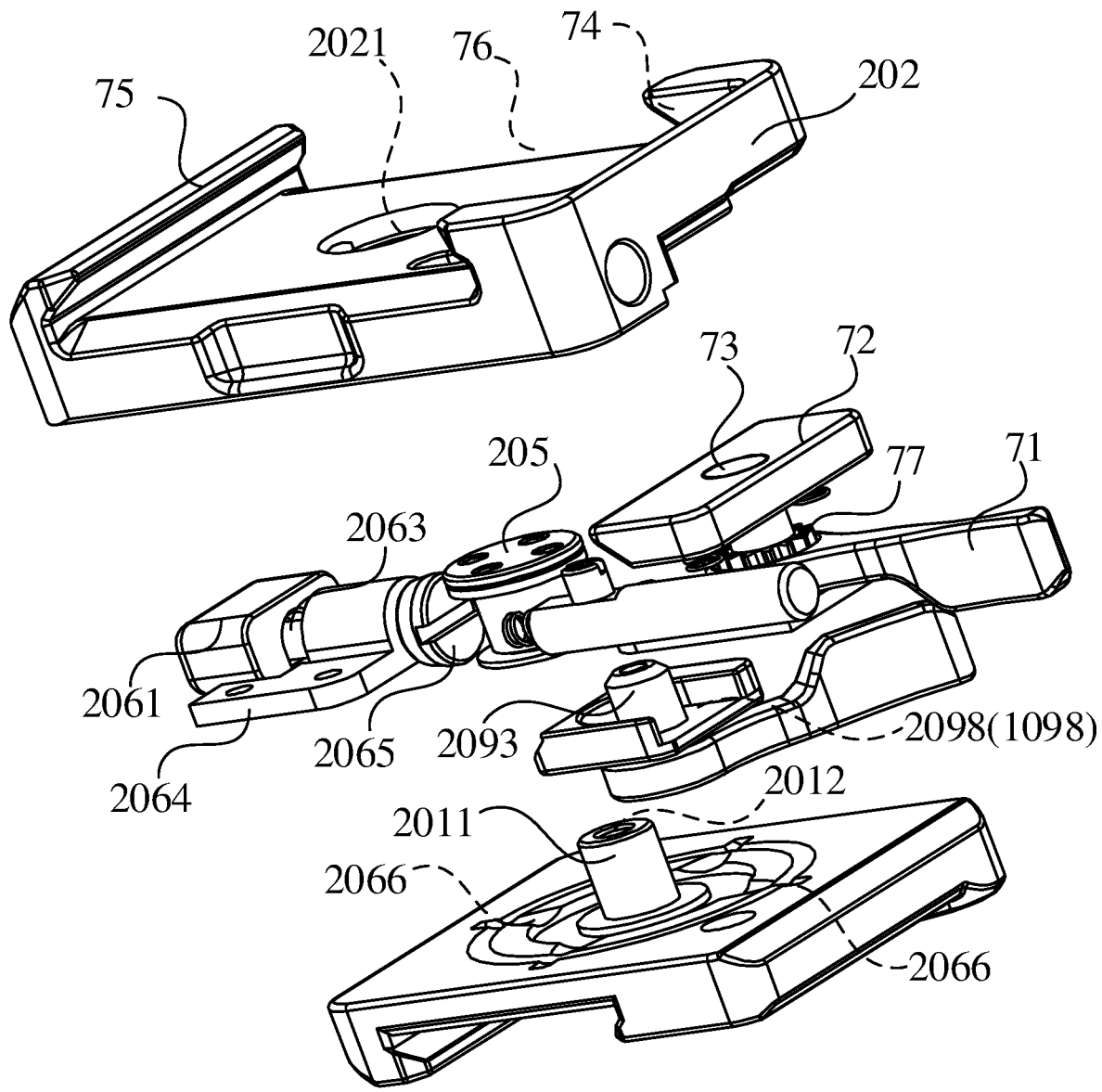
FIG. 13 is a third-perspective exploded view of the adapter of FIG. 9 according to some aspects of the disclosure.
Figure 14:
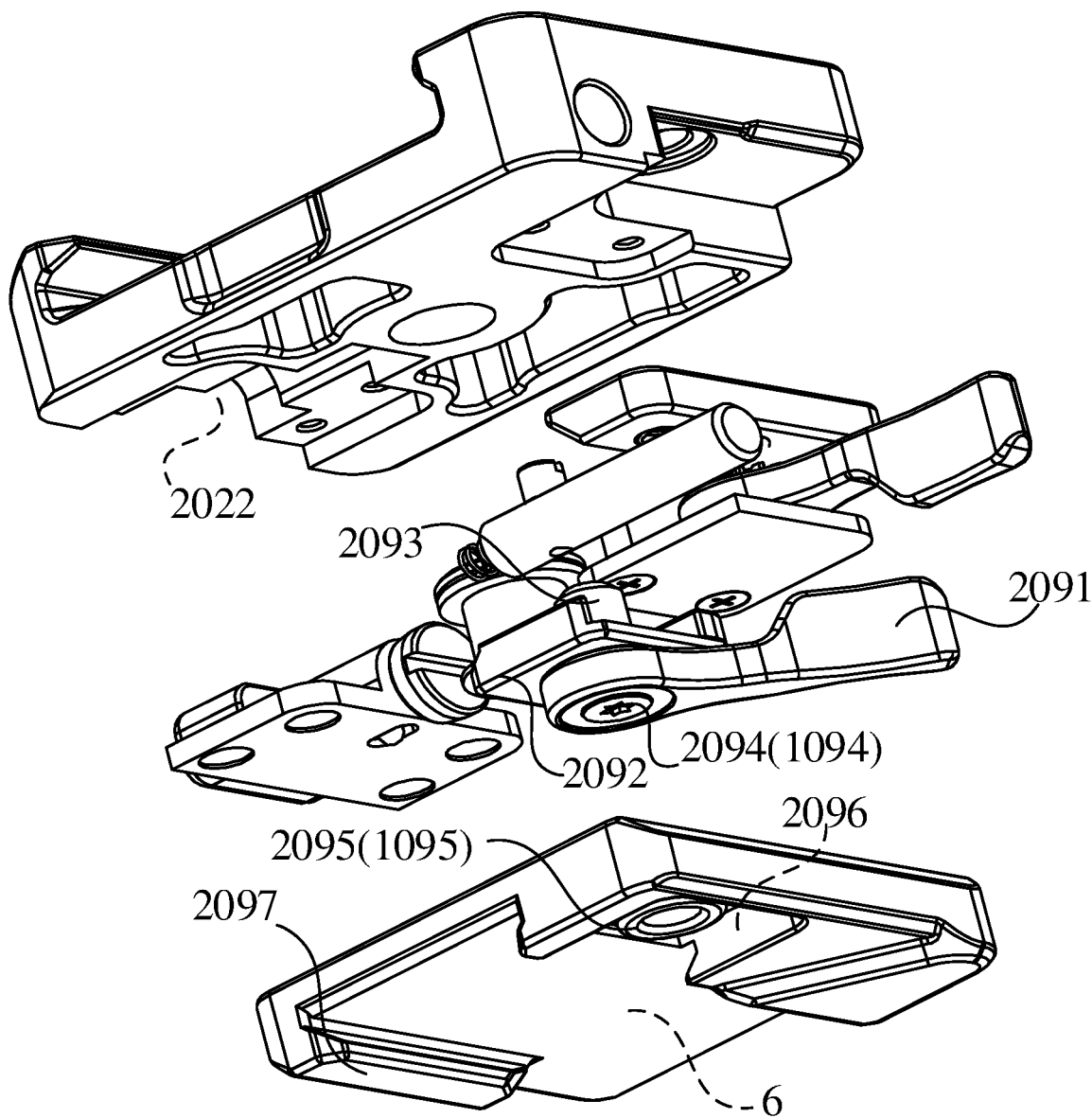
FIG. 14 is a fourth-perspective exploded view of the adapter of FIG. 9 according to some aspects of the disclosure.
Figure 15:
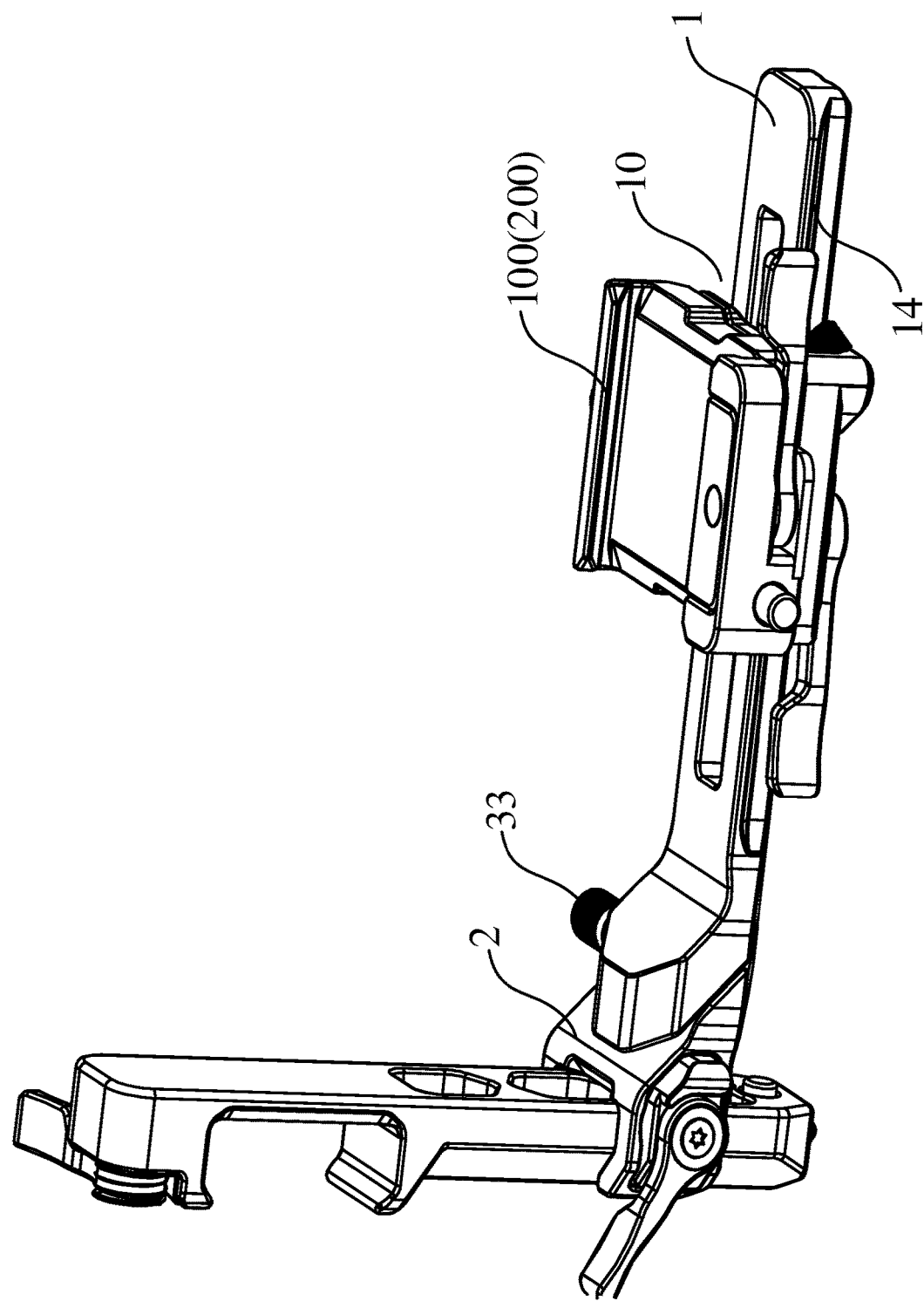
FIG. 15 is a schematic diagram of an adapter installed on the horizontal-vertical switching structure according to some aspects of the disclosure.

Referring to FIGS. 1-3, the present disclosure relates to a horizontal-vertical switching structure comprising the following components:

Supporting component 1: One end is equipped with an installation position 10 for mounting a shooting device, while the other end features an inclined first inclined surface 11.

Connecting component 2: It is provided with a second inclined surface 12 that cooperates with the first inclined surface 11.

Locking component 3: Consisting of a first rotating portion 31 and a second rotating portion 32 that can rotate relative to each other. The first rotating portion 31 is connected to the first inclined surface 11, and the second rotating portion 32 is connected to the second inclined surface 12, thereby enabling rotation or locking of the supporting component 1 and the connecting component 2.

During practical use, by mounting the shooting device on the installation position 10, the shooting angles of the device in the horizontal and vertical directions can be switched by rotating the supporting component 1 and the connecting component 2 along the contact surfaces of the first inclined surface 11 and the second inclined surface 12. This switching can be achieved without the need for disassembling and reinstalling the shooting device, thereby providing a highly convenient angle adjustment.

In this embodiment, the connecting component 2 is further equipped with a gimbal connection position 21, which can be connected to a gimbal. The second inclined surface 12 is located at one end of the connecting component 2, while the gimbal connection position 21 is positioned at the other end.

In this embodiment, the first rotating portion 31 comprises a pivot axis 311, and the second rotating portion 32 includes a first positioning column 321. The first positioning column 321 protrudes from the second inclined surface 12 and is provided with a first through-hole 3211. The first inclined surface 11 features a second through-hole 111, and the first positioning column 321 passes through the second through-hole 111. The first through-hole 3211 and the second through-hole 111 are in communication, allowing the pivot axis 311 to sequentially pass through the first through-hole 3211 and the second through-hole 111. As a result, the supporting component 1 and the connecting component 2 can slide (e.g., rotate) along the first inclined surface 11 and the second inclined surface 12.

In this embodiment, the locking component 3 includes a first locking screw 33. The side wall of the supporting component 1 is arranged with a third through-hole 13, and the first locking screw 33 passes through the third through-hole 13 to abut against the first positioning column 321, thereby preventing relative rotation between the supporting component 1 and the connecting component 2. With this configuration, when rotation is desired, the first locking screw 33 can be loosened, and when fixation is required, the first locking screw 33 can be tightened.

In this embodiment, either the second inclined surface 12 or the first inclined surface 11 can be provided with an annular limiting groove (e.g., limiting groove 4 shown in FIG. 2) that surrounds the first positioning column 321. Moreover, the first inclined surface 11 or the second inclined surface 12 can be furnished with a limit column (e.g., limit column 5 shown in FIG. 3). The limit column 5 is slidably disposed within the annular limiting groove 4, which serves to restrict the rotational angle between the supporting component 1 and the connecting component 2.

Embodiment 2

Referring to FIGS. 1-8, a connecting mechanism employing a horizontal-vertical switching structure is provided in this embodiment. The connecting mechanism comprises the horizontal-vertical switching structure described in Embodiment 1 above and an adapter component 100. The adapter component 100 includes a fixing portion 101 (a fixing part) and a rotating portion 102 (a rotating part), which are movably connected together. On the side of the fixing portion 101 facing away from the rotating portion 102, a first locking component 103 is provided for securing the installation position 10, while on the side of the rotating portion 102 facing away from the fixing portion 101, a second locking component 104 is provided to lock the shooting device. The fixing portion 101 and the rotating portion 102 are rotatably connected.

With this arrangement, when transitioning to the vertical shooting mode, the supporting component 1 rotates 90° relative to the connecting component 2, thereby orienting the supporting component 1 vertically and enabling the vertical shooting mode. Simultaneously, due to the rotation of the supporting component 1, the camera lens mounted in the installation position rotates from the front to the back along with the supporting component 1. Furthermore, the rotating portion 102 is rotated to achieve a 180° rotation relative to the fixing portion 101, ensuring that the lens faces forward.

In this embodiment, the adapter 100 further includes an adapter shaft 105 (connecting shaft), which facilitates the rotational connection between the rotating portion 102 and the fixing portion 101.

In this embodiment, the fixing portion 101 on the side facing the rotating portion 102 is equipped with a second positioning column 1011. The second positioning column 1011 features a fourth through-hole 1012 in the middle, while the rotating portion 102 is provided with a first mounting hole 1021. The second positioning column 1011 passes through the first mounting hole 1021, and the fourth through-hole 1012 and the first mounting hole 1021 are in communication. The adapter shaft 105 sequentially passes through the fourth through-hole 1012 and the first mounting hole 1021, enabling the rotating portion 102 to rotate relative to the fixing portion 101.

In this embodiment, the adapter 100 includes a first locking limiting portion 106. The side wall of the rotating portion 102 is also furnished with a fifth through-hole 1022. The first locking limiting portion 106 passes through the fifth through-hole 1022 to lock or release the rotating portion 102 and the fixing portion 101, thereby preventing or allowing the rotating portion 102 to rotate relative to the fixing portion 101.

In this embodiment, the first locking limiting portion 106 is threadedly connected to the fifth through-hole 1022, allowing it to move closer to or away from the second positioning column 1011. During usage, when the first locking limiting portion 106 is tightened, it abuts against the second positioning column 1011, restricting the rotation of the rotating portion 102 relative to the fixing portion 101. Conversely, when the first locking limiting portion 106 is loosened, it moves away from the second positioning column 1011, enabling the rotating portion 102 to rotate relative to the fixing portion 101 for adjusting the direction.

In this embodiment, the fixing portion 101 is equipped with a limit portion 8 (see FIG. 8) that are elastically connected to the fixing portion 101. The side of the rotating portion 102 facing the fixing portion 101 features multiple second limit grooves 1023 corresponding to the limit portion 8. By switching to the vertical shooting mode, the limit portion 8 compresses, resulting in a 180° rotation of the rotating portion 102 relative to the fixing portion 101.

In this embodiment, the limit portion 8 comprises a toggle block 81, a first limiting block 82, and a first limiting spring 83. The fixing portion 101 is provided with interconnected first mounting slots 107 and second mounting slots 108. The first limiting spring 83 and the first limiting block 82 are positioned in the first mounting slot 107, with the first limiting spring 83 located between the first limiting block 82 and the bottom of the first mounting slot 107. The first limiting block 82 partially protrudes from the fixing portion 101, and one end of the toggle block 81 is connected to the first limiting block 82, while the other end protrudes from the fixing portion 101. By toggling the toggle block 81 (toggling block), the first limiting block 82 retracts into the first mounting slot 107, allowing the rotating portion 102 to rotate relative to the fixing portion 101. Releasing the toggle block 81 causes the first limiting block 82 to be urged back by the first limiting spring 83 and protrude from the fixing portion 101, engaging with the second limit groove 1023 and preventing the rotating portion 102 from rotating relative to the fixing portion 101.

In this embodiment, a first locking component incorporates a first locking button 1091, a first locking portion 1092, and a first locking column 1093. The first locking column 1093 is provided with a toothed disk 1094 (see FIG. 8) or toothed mechanism at one end, which engages with the first locking button 1091. The other end of the first locking column 1093 is threadedly connected to the first locking portion 1092. Additionally, the first locking column 1093 is threadedly connected to a third positioning column 1095 on the fixing portion 101. The fixing portion 101 also includes a third mounting slot 1096, while one end of the fixing portion 101, opposite the third mounting slot 1096, is equipped with a first clamping block 1097. By arranging the first locking portion 1092 in the third mounting slot 1096, a first clamping space 6 is formed in conjunction with the first clamping block 1097. In this embodiment, as the third mounting slot 1096 rotates, the first locking column 1093, being threadedly connected to the first locking portion 1092, is tightened at one end, causing the first locking portion 1092 to move closer to the bottom of the slot. Ultimately, the first locking portion 1092 engages with the first clamping block, thereby securely fixing the fixing portion 101 onto the supporting component.

In this embodiment, the first locking portion 1092 is provided with a third limit groove 1098, while the bottom of the third mounting slot 1096 protrudes to accommodate a third positioning column 1095. This structural arrangement effectively prevents the first locking portion 1092 from experiencing any wobbling.

In this embodiment, the supporting component 1 is equipped with slide slots 14 on both sides, within which the first locking portion 1092 and the first clamping block are slidably arranged. When the fixing portion 101 is tightened through the third mounting slot 1096, it can be securely locked at any position within the slide slots 14.

Additionally, the rotating portion 102 is furnished with a first elongated hole 61, while the side of the fixing portion 101 features a fourth mounting slot 62 that connects to the first elongated hole 61. The connecting mechanism further comprises a second limiting block 63 and a first actuating block 64. The first actuating block 64 is accommodated within the fourth mounting slot 62, and a second limiting spring 66 is positioned between the bottom of the fourth mounting slot 62 and the first actuating block 64. The second limiting block 63 is housed within the first elongated hole 61, protruding out from the rotating portion 102.

Alternatively, in another implementation, the first clamping space 6 may also be provided with a first elongated hole 61, while the side of the rotating portion 102 features a fourth mounting slot 62 that connects to the first elongated hole 61. The connecting mechanism further comprises a second limiting block 63 and a first actuating block 64. The first actuating block 64 is accommodated within the fourth mounting slot 62, and a second limiting spring 66 is positioned between the bottom of the fourth mounting slot 62 and the first actuating block 64. The second limiting block 63 is housed within the first elongated hole 61, protruding out from the first clamping space 6. The supporting component 1 includes an avoidance groove, and a limiting hook is provided on the side wall of the avoidance groove, away from one end of the connection component. The purpose of the avoidance groove is to prevent interference with the second limiting block 63, while the limiting hook serves to prevent the fixing portion 101 from sliding off the supporting component 1. Specifically, an unlocking passage is present between the limiting hook and the other side wall of the avoidance groove. When the first actuating block 64 is pressed, it induces relative sliding motion between the second limiting block 63 and the first elongated hole 61. If, at this point, the fixing portion 101 is removed from the supporting component 1, the second limiting block 63 can slide off through the unlocking passage. Conversely, if the first actuating block 64 is not pressed, the limiting hook will restrict the movement of the second limiting block 63, thereby preventing the fixing portion 101 from sliding off the supporting component 1. Alternatively, in another implementation, the first clamping space 6 is elastically furnished with a third limiting block 65, while the end of the avoidance groove is equipped with a limiting hole. As the fixing portion 101 is slid into the avoidance groove, the third limiting block 65 compresses. When the fixing portion 101 reaches the end, the third limiting block 65 elastically protrudes into the limiting hole, effectively achieving an anti-detachment effect.

Embodiment 3

Referring to FIGS. 1-3, 9-14, a connecting mechanism incorporating a horizontal-vertical switching structure is described in this embodiment. The connecting mechanism includes the horizontal-vertical switching structure as presented in Embodiment 1 and an adapter 200. The adapter 200 consists of a fixing portion 201 (a fixing part) and a rotating portion 202 (a rotating part), which are movably connected. The fixing portion 201, positioned on one side away from the rotating portion 202, is equipped with a first locking component 203 for securing the mounting position. The rotating portion 202, located on the side opposite the fixing portion 201, is equipped with a second locking component 204 for locking the shooting device. The fixing portion 201 and the rotating portion 202 are rotationally and movably connected.

In this embodiment, the adapter 200 further includes an adapter shaft 205 (connecting shaft), which facilitates the rotational connection between the rotating portion 202 and the fixing portion 201.

Moreover, the fixing portion 201 is equipped with a second positioning column 2011 on the side facing the rotating portion 202. The second positioning column 2011 features a fourth through-hole 2012 in the middle. The rotating portion 202 has a first mounting hole 2021. The second positioning column 2011 passes through the first mounting hole 2021, and the fourth through-hole 4012 and the first mounting hole 2021 are in communication. The adapter shaft 205 is inserted sequentially into the fourth through-hole 2012 and the first mounting hole 2021, enabling the rotating portion 202 to rotate relative to the fixing portion 201.

In this embodiment, the adapter component 200 comprises a first locking limit part 206, and the rotating portion 202's side wall is equipped with a fifth through-hole 2022. The first locking limit part 206 passes through the fifth through-hole 2022 to lock or release the rotation between the rotating portion 202 and the fixing portion 201. This action prevents or allows the rotation of the rotating portion 202 relative to the fixing portion 201.

The first locking limit part 206 includes a reset spring (not shown in the drawing), a button 2062, a first limiting bar 2063, and a fixing block 2064. One end of the first limiting bar 2063 connects to the button 2062, protruding from the outer side of the rotating portion 202. The other end of the first limiting bar 2063 has a limiting projection 2065. The first limiting bar 2063 is movably connected to the fixing block 2064, and the reset spring is positioned on the first limiting bar 2063, with both ends respectively connected to the fixing block 2064 and the button 2062. The fixing portion 201, on the side facing the rotating portion 202, features multiple first limiting grooves 2066 inclined towards the second positioning column 2011. Pressing the button 2062 causes the limiting projection 2065 of the first limiting bar 2063 to move along the fifth through-hole 2022 and the inclined first limiting grooves 2066. Due to the inclined first limiting grooves 2066, the contact area between the limiting projection 2065 and the fixing portion gradually reduces until there is no contact, enabling the rotating portion 202 to rotate relative to the fixing portion 201. This structure provides an additional method to restrict the relative rotation between the rotating portion 202 and the fixing portion 201. Compared to embodiment 2, the button 2062-centered structure allows for more convenient and rapid switching between rotation and locking of the rotating portion 202 and the fixing portion 201.

The first locking component 203 also includes a first locking button 2091, a first locking portion 2092, and a first locking column 2093. One end of the first locking column 2093 is equipped with a gear 2094, engaging with the first locking button 2091. The other end of the first locking column 2093 is threadedly connected to the first locking portion 2092, and it is also threadedly connected to a third positioning column 2095. The fixing portion 201 has the third mounting slot 2096, and the opposite end of the fixing portion 201 is equipped with a first clamping block 2097. The first locking portion 2092 is positioned within the third mounting slot 2096, forming a first clamping space 6 in conjunction with the first clamping block. When the first locking button 2091 rotates, the first locking column 2093, connected to the first locking portion 2092, tightens and moves the first locking portion 2092 towards the bottom of the slot. Ultimately, the first locking portion 2092 engages with the first clamping block 2097, securely fixing the fixing portion 201 onto the supporting component 1.

In this embodiment, the first locking portion 2092 includes a third limiting groove 2098, and the bottom of the third mounting slot 2096 protrudes to accommodate a third positioning column 2095, which fits within the third limiting groove 2098. This configuration prevents any wobbling of the first locking portion 2092.

In this embodiment, the supporting component 1 is equipped with slide slots 14 on both sides, where the first locking portion 2092 and the first clamping block are slidably arranged. When the fixing portion 201 is locked via the third mounting slot 2096, it can be secured at any position within the slide slots 14.

In this embodiment, the second locking component 204 includes a second locking buckle 71, a second locking portion 72, and a second locking column 73. One end of the second locking column 73 is equipped with a gear that engages with the second locking buckle 71. The other end of the second locking column 73 is threadedly connected to the second locking portion 72. The rotating portion 202 is also equipped with a fifth mounting slot 74, and the end of the rotating portion 202 opposite to the fifth mounting slot 74 features a second clamping block 75. The second locking portion 72 is positioned within the fifth mounting slot 74, creating a second clamping space 76 in conjunction with the second clamping block 75. In operation, the second locking buckle 71 drive the thread on the end between the second locking column 73 and the second locking portion 72 to be tighten through the meshing teeth, causing the second locking portion 72 to move closer to the second locking buckle 71. Consequently, the second locking portion 72 descends towards the bottom of the fifth mounting slot 74 and ultimately engages with the second clamping block 75, securely locking external shooting devices such as a camera quick release plate or a camera cage.

The above description provides exemplary embodiments of the present disclosure, which should not be considered as limiting the scope of the disclosure. Any modifications, equivalent substitutions, or improvements made within the spirit and principles of the present disclosure should fall within the scope of the protection provided by the present disclosure.

The above are only the exemplary embodiments of the present disclosure and are not intended to limit the present disclosure. Any modification, equivalent substitution and improvement made within the spirit and principle of the present disclosure should fall within the protection scope of the present disclosure.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A horizontal-vertical switching structure comprising:
   a supporting component comprising a first end and a second end, the first end being equipped with an installation position for mounting a shooting device, and the second end being inclined to form a first inclined surface;
   a connecting component equipped with a second inclined surface that complements the first inclined surface; and
   a locking component comprising a pivot shaft and a first positioning column capable of relative rotation with the pivot shaft, the pivot shaft being connected to the supporting component, and the first positioning column being connected to the connecting component, enabling the supporting component and the connecting component to rotate or lock to each other,
   wherein the locking component further comprises a first locking screw, and a sidewall of the supporting component has a hole through which the first locking screw passes.

2. The horizontal-vertical switching structure according to claim 1, wherein:
   the first positioning column protrudes from the second inclined surface toward the first inclined surface and has a first through-hole,
   the first inclined surface having a second through-hole, and the first positioning column passing through the second through-hole, with the first through-hole and the second through-hole being in communication,
   the pivot shaft passing through the first through-hole and the second through-hole in sequence.

3. The horizontal-vertical switching structure according to claim 2, wherein:
   the second inclined surface or the first inclined surface is provided with an annular limit groove around the first positioning column; and
   the first inclined surface or the second inclined surface has a limit pin, and the limit pin is configured to slide within the annular limit groove.

4. A connecting mechanism adopting a horizontal-vertical switching structure, comprising:
   an adapter and the horizontal-vertical switching structure according to claim 1,
   the adapter comprising:
   a fixing part; and
   a rotating part that is movably connected to the fixing part,
   a first side of the fixing part opposite to the rotating part being provided with a first locking component configured to lock in an installation position, and
   a first side of the rotating part opposite to the fixing part being provided with a second locking component configured to lock the shooting device.

5. The connecting mechanism according to claim 4, further comprising an adapter that incorporates a connecting shaft, the rotating part and the fixing part being connected in a rotatable manner through utilization of the connecting shaft.

6. The connecting mechanism according to claim 5, wherein:
   the fixing part comprises:
   a second positioning column facing the rotating part; and
   a fourth through-hole within a central region of the second positioning column,
   the rotating part comprises:
   a first mounting hole, the second positioning column passing through the first mounting hole, establishing communication with the fourth through-hole; and
   a connecting shaft traversing the fourth through-hole and the first mounting hole in a sequential order.

7. The connecting mechanism according to claim 6, wherein the adapter further comprises a first locking limit portion, a side wall of the rotating part comprising a fifth through-hole, the first locking limit portion extending through the fifth through-hole.

8. The connecting mechanism according to claim 7, wherein the first locking limit portion comprises:
   a reset spring;
   a button;
   a first limiting bar; and
   a fixed block,
   the button being connected to a first end of the first limiting bar, which protrudes from an outer side of the side wall of the rotating part, a second end of the first limiting bar provide with a limiting projection,
   the first limiting bar being movably connected to the fixed block, and the reset spring enclosing the first limiting bar, with both ends of the first limiting bar respectively attached to the fixed block and the button, and
   the fixing part encompassing a plurality of first limiting slots, inclined in the direction of the second positioning column at a side facing the rotating part.

9. The connecting mechanism according to claim 4, wherein:
   the fixing part is provided with a limit portion that is elastically connected to the fixing part; and
   the rotating part, facing the fixing part, is provided with a second limiting slot, corresponding to the limit portion.

10. The connecting mechanism according to claim 9, wherein:
    the limit portion comprises a toggling block, a first limiting block, and a first limiting spring;
    the fixing part comprises connected a first mounting slot and a second mounting slot, the first limiting spring and the first limiting block being arranged within the first mounting slot, with the first limiting spring positioned between the first limiting block and the bottom of the first mounting slot; and
    the first limiting block, partially protruding from the fixing part, is connected to a first end of the toggling block, and a second end of the toggling block extends from the fixing part.

11. The connecting mechanism according to claim 4, wherein the first locking component further comprises:

a first locking button;
a first locking portion; and
a first locking column,
a first end of the first locking column comprising a toothed disk that engages with the first locking button via a toothed mechanism,
a second end of the first locking column being threadedly connected to the first locking portion,
the fixing part providing a third mounting slot, with one end of the third mounting slot opposite to a first clamping block at one end of the fixing part, and
the first locking portion being positioned within the third mounting slot, creating a first clamping space in conjunction with the first clamping block.

12. The connecting mechanism according to claim 11, wherein the first locking portion comprises a third limiting slot, a bottom of the third mounting slot within the fixing part protrudes to accommodate a third positioning column, to which the first locking column is threadedly connected.

13. The connecting mechanism according to claim 11, wherein the supporting component is equipped with slide grooves on both sides of the supporting component, within the slide grooves, the first locking portion and the first clamping block being configured to allow sliding movement.

14. The connecting mechanism according to claim 11, wherein:
a bottom of the first clamping space comprises a first hole;
on a side of the fixing part, a fourth mounting slot is present, allowing communication with the first hole; and
the connecting mechanism further comprises a second limiting block and a first actuating block,
the first actuating block being positioned within the fourth mounting slot, with a second limiting spring situated between the fourth mounting slot and a bottom of the first actuating block,
the second limiting block being accommodated within the first hole, protruding into the first clamping space.

15. The connecting mechanism according to claim 4, further comprises:
a second locking button;
a second locking portion; and
a second locking column,
a first end of the second locking column comprising a toothed disk that engages with the second locking button, a second end of the second locking column being threadedly connected to the second locking portion, and
the rotating part comprising a fifth mounting slot, with one end opposite to the fifth mounting slot housing a second clamping block, the second locking portion being accommodated within the fifth mounting slot, forming a second clamping space in conjunction with the second clamping block.

16. A shooting device comprising a connecting mechanism with a horizontal-vertical switching structure as described in claim 4.

17. The horizontal-vertical switching structure according to claim 1, wherein the first inclined surface is configured to slide relative to the second inclined surface.

* * * * *